United States Patent [19]
Solop

[11] 3,821,332
[45] *June 28, 1974

[54] EXTRA HIGH MOLECULAR WEIGHT PARTICLE FORM POLYETHYLENE-POLYISOBUTYLENE BLEND

[75] Inventor: Eli Solop, Bartlesville, Okla.

[73] Assignee: Phillips Petroleum Company, Bartlesville, Okla.

[*] Notice: The portion of the term of this patent subsequent to July 25, 1978, has been disclaimed.

[22] Filed: Sept. 13, 1971

[21] Appl. No.: 180,224

Related U.S. Application Data

[63] Continuation-in-part of Ser. No. 877,835.

[52] U.S. Cl. .................................... 260/897 A
[51] Int. Cl. .................................... C08f 29/12
[58] Field of Search .......................... 260/897

[56] References Cited
UNITED STATES PATENTS

| | | | |
|---|---|---|---|
| 2,825,709 | 3/1958 | Sturm | 260/28.5 |
| 2,854,435 | 9/1958 | Briggs et al. | 260/45.5 |
| 2,993,876 | 7/1961 | McGlamery | 260/45.5 |
| 3,074,616 | 1/1963 | Martinovich et al. | 229/53 |

OTHER PUBLICATIONS

Encyclopedia of Polymer Technology, Vol. 6, pp. 332–338, pub–(1967).

*Primary Examiner*—Murray Tillman
*Assistant Examiner*—C. J. Seccuro

[57] ABSTRACT

Extra high molecular weight particle form polyethylene-polyisobutylene blends are produced wherein the two components are present in the weight percent ranges of 70–85 percent and 30–15 percent, respectively, and the attendant physical properties render said blends particularly adaptable to the manufacture of films.

6 Claims, No Drawings

EXTRA HIGH MOLECULAR WEIGHT PARTICLE FORM POLYETHYLENE-POLYISOBUTYLENE BLEND

BACKGROUND OF THE INVENTION

This invention is a continuation-in-part of my copending application Ser. No. 877,835, filed Nov. 18, 1969 now abandoned.

This invention relates to resinous compositions. More particularly, this invention relates in one aspect to compositions comprising extra high molecular weight particle form polyethylene and polyisobutylene. In another aspect, this invention relates to high impact films and other sheet materials formed from extra high molecular weight polyethylene-polyisobutylene blends. In a further aspect, this invention relates to a process for improving the processing characteristics, especially the extrusion and molding characteristics, of extra high molecular weight polyethylene by the addition of polyisobutylene thereto.

Polyethylene is often characterized by its moecular weight and by its flow properties which, to some extent, depends on molecular weight. Most of the time this is done indirectly by using melt index (MI), which is related to molecular weight and molecular weight distribution. By using a high load melt index (HLMI, condition F of ASTM D-1238-65T) as well as the melt index (MI, condition E of ASTM D-1238-65T), it is possible to divide all of the high density molecular weight materials into four groups. The low and high molecular weight materials which have average molecular weights from 50,000–250,000 comprising the first two groups as characterized by MI which by present condition E of ASTM D-1238-65T is defined as the amount, in grams, of a thermal plastic resin which can be forced through a 0.0825 inch orifice when subjected to 2,160 grams force in 10 minutes at 190°C. Testing polyethylene with an average molecular weight above 250,000 using condition E of ASTM D-1238-65T yields a melt index result of 0. Therefore the polyethylenes having molecular weights in the range of 250,000 to 1.5 million are characterized by high load melt index which is defined as the rate of flow of a molten resin through a 0.0825 inch orifice when subjected to a force of 21,600 grams at 190°C. There is also a fourth group usually called ultrahigh molecular weight, high density polymers wherein the average molecular weights exceed 1.5 million. Recognition of certain properties as differentiating the molecular weight ranges of ethylene polymers has resulted in the conventional nomenclature which describes ethylene polymers as low molecular weight, high molecular weight, extra high molecular weight, and ultra-high molecular weight.

This invention directs itself to the third group, the extra high molecular weight, high density polymers. As mentioned above this group of ethylene polymers is characterized by high load melt index and can be described as having an average molecular weight in a range greater than 250,000 up to less than 1.5 million or as conventionally stated in the art a molecular weight range of 250,000 to 1.5 million. In this characterization the numerical value at each end of the range is used only as a convenient reference point and, as one skilled in the art understands, the average molecular weight falls between these limiting numbers the lower of which is the upper limit of the high molecular weight range and the higher of which is the bottom limit of the ultra-high molecular weight range.

The molecular weight determinations for the samples of polyethylene used herein were made by Gel Permeation Chromatography as described by J. C. Moore, J. Polymer Science, Part A, Vol. 2, 835–843 (1964) and N. Nakajima, same journal, Vol. 5, 101–111 (1966).

The advantages of extra high molecular weight resins over high molecular weight resins lie principally in their increased stress-cracking resistance, and greater impact strength as indicated by the comparative data in Table I.

TABLE I

Comparison of the Nominal Physical Properties of an Extra High Molecular Weight Polyethylene with a High Molecular Weight Ethylene-Butene-1 Copolymer

| Property | ASTM Test | EHMWPE** | Ethylene-Butene-1 Copolymer |
| --- | --- | --- | --- |
| Density, gms/cc | D-1505-65T | 0.943 | 0.950 |
| Melt Flow, Con. F* gms/10 min. | D-1238-65T | 6.0 | ***0.3 |
| Enfironmental Stress Cracking Resistance, Hrs., $F_{50}$ | D-1693-60T | >1,500 | 225 |
| Tensile Yield Strength, psi 2"/min. | D-638-64T, Die C of D-412-66 | 3,000 | 3,300 |
| Impact Strength, ft. lbs./in. notch | D-256-56 | 7 | 2 |
| Vicat Softening Temp., °F. | D-1525-65T | 258 | 252 |
| Brittleness Temp., °F. | D-746-64T | <−180 | <−180 |
| Flexural Modulus, psi | D-790-66 | 140,000 | 165,000 |
| Hardness, Shore D | D-1706-61 | 64 | 65 |
| Ultimate Elongation, % 2"/min. | D-638-64T, Die C of D-412-66 | 600 | 600 |

\* Usually referred to as High Load Melt Index (HLMI).
\*\* Extra High Molecular Weight Polyethylene.
\*\*\* Melt Index, Cond. E, gms/10 min.
*NOTE:* The copolymer is a high molecular weight, high density ethylene-butene-1 copolymer.

Extra high molecular weight polyethylene, however, is more difficult to process into finished parts because of its inherent toughness. For some applications, the properties of extra high molecular weight polyethylene offer such advantages that it is becoming more widely accepted by industry in spite of the processing problems.

The present invention seeks to combine the relative merits of toughness and processability in the same composition via the consequential unexpected properties of an extra high molecular weight polyethylene blended with polyisobutylene. Accordingly, it has been found that compositions consisting essentially of extra high molecular weight polyethylene (weight average molecular weight from 250,000–1.5 million in the weight percentage range of 70–85 percent and high molecular weight polyisobutylene (weight average molecular weight from 80–120,000) in the weight percetange range of 30–15 percent, respectively, provide resinous compositions with substantial improved processability and improved physical characteristics.

OBJECTS OF THE INVENTION

An object of this invention is to provide film forming compositions from extra high molecular weight polyethylene.

Another object of this invention is to develop an improved extra high molecular weight particle form polyethylene resinous composition.

Another object of this invention is to produce high impact strength films from extra high molecular weight polyethylene.

It is a further object of this invention to develop a particle form polymer of polyethylene blended with polyisobutylene suitable for use in various blow molding, injection molding, thermoforming and extrusion processes which utilize conventional equipment and operating characteristics.

A further object of this invention is to improve the processing, and especially the extrusion, characteristics of extra high molecular weight polyethylene.

SUMMARY OF THE INVENTION

This invention relates to resinous compositions consisting essentially of extra high molecular weight particle form polyethylene, wherein the weight average particle form polyethylene molecular weights range from 250,000 to 1.5 million, said particle form polyethylene being present in the weight percentage range of 70–85 percent, and polyisobutylene of Staudinger molecular weight range 80,000 to 120,000 being present in the range of 30–15 percent by weight, respectively. Said blends have excellent impact strength, stress cracking resistance, and melt strength properties and are readily processible to be utilized in numerous manufacturing operations wherein such porperties are desired.

UTILITY OF THE INVENTION

Extra high molecular weight polyethylene blends make for excellent thermoforming resins, especially for very large shallow draw parts because of their particularly high melt strength. Melt strength is determined by measuring the time in seconds for an extruded parison of a given weight to fall from the die. Increasing the melt temperature generally reduces the melt strength. However, the extra high molecular weight material had a melt strength of 52 seconds compared to 10 seconds for a high molecular weight polyethylene. Greater melt strength is essential so as to avoid excessive webbing or wrinkling during extrusion or thermoforming processes. Extra high molecular weight polyethylene blends are also suitable for various extrusion processes, particularly in the sheet and pipe areas. The extra high molecular weight resins exhibit less die swell; in fact, when long land dies are used little, if any, swelling is detected. Furthermore, in pipe extrusion, the extra high molecular weight polyethylene resins permit greater long term hoop stress primarily because of the inherent melt strength.

Utility of greater melt strength is also apparent in blow molding techniques wherein high melt strength is especially important in the making of heavy parts because thinning or neckdown at the top of the parison is reduced and wide distribution improved. These characteristics together with the improved physical properties of impact strength, stress cracking resistance, and toughness should allow extra high molecular weight polyethylene-polyisobutylene blends to replace more expensive materials in injection molding applications as well as wherein such properties are desired.

A further utility of the composition blends set forth in this invention resides in the coating composition field. One application is for the lamination of such a film to another substrate when it is desired to take advantage of the "barrier properties" of the high density material. Another usage of such a film is that of a one-pass typewriter ribbon made from a thin, high density, extra high molecular weight polyethylene film having a very thin coating of ink laid on it.

Table II compares the relative physical properties of 2 and 5 mil coating films made from the 80/20 extra high molecular weight polyethylene-polyisobutylene blend of this invention (Tests 3 and 4) with the physical properties of 2 and 5 mil films of an extra high molecular weight polyethylene resin (Tests 1 and 2), but which does not contain polyisobutylene. The significant results derive principally from the dart drop test and the Elmendorf test (TD). The toughness of the extra high molecular weight polyethylene-polyisobutylene films in conjunction with the other physical properties which are more than adequate, indicate that a particle formed polyethylene can be formulated with polyisobutylene to provide exceptionally tough films suitable for packaging, overwrap, bags, etc.

TABLE II

| Test Number Composition | (1) EHMWPE* | (2) EHMWPE | (3) EHMWPE/PIB** 80/20 | (4) EHMWPE/PIB 80/20 |
|---|---|---|---|---|
| Film Size (mil) | 5 | 2 | 2 | 5 |
| Dart Drop ASTM D-1922-61T | <280 at 60" | 108 at 26" | 224 at 26" | 310 at 60" |
| Elmendorf (M.D.) ASTM-1922-61T | 245 | 55 | 41 | 194 |
| (T.D.) | 270 | 74 | 230 | 710 |

TABLE II—Continued

| Test Number | (1) | (2) | (3) | (4) |
|---|---|---|---|---|
| Composition | EHMWPE* | EHMWPE | EHMWPE/PIB** | EHMWPE/PIB |
|  |  |  | 80/20 | 80/20 |
| Film Size (mil) | 5 | 2 | 2 | 5 |
| Tensile Break (M.D.) ASTM D-822 | 4675 | 5035 | 3720 | >3635 |
| (T.D.) | 4775 | 5345 | 4160 | >3235 |
| Elongation % (M.D.) ASTM D-822 | >700 | >665 | 540 | >710 |
| (T.D.) | >700 | >685 | >675 | >690 |

*Extra High Molecular Weight Polyethylene
**Extra High Molecular Weight Polyethylene/Polyisobutylene Referring to the above table, it will be noted that the two important parameters which are improved by the polyisobutylene are the Elmendorf TD that is transverse direction strength which is related to Tear Strength and the Dart Drop Strength which, of course, measures the toughness of the film. The remaining properties have not been changed sufficiently to constitute either improvement or deterioration, and this is important in that the resin blend retains its overall usefulness but becomes more useful for the making of films, especially thin films for packaging. It has been well established in the packaging industry that toughness and tear resistnace are prime factors in the utility of films in high speed packaging operations. The improvement in the blends of this invention is rather striking. The dart drop test for a 5 mil film increases from 280 to 310 gm. at 60inches, a 12 percent improvement, while the Elmendorf (TD) test value goes from 270 to 710 gms., an increase in film toughness of 175 percent. The results for the 2 mil film are even more striking, the dart drop values more than double, going from 108 to 224 gms., and the Elmendorf (TD) test value triples, going from 74 to 230 gms. The resulting film not only has great strength but is virtually clear, so that the contents of a package are clearly visible. From a consumer's point of view, these films provide a clear, strong wrap which will withstand repeated handling and which will not fail when subjected to minor household accidents.

DESCRIPTION OF PREFERRED EMBODIMENTS

The extra high molecular weight polyethylene referred to in test numbers 3 and 4 of Table II may be prepared in a manner similar to that as put forth in British Pat. No. 853,414. Extra high molecular weight polyethylene is produced in the polymerization of ethylene in the presence of a chromium oxide catalyst within the 100°–500°F temperature range, preferably 275°–375°F.

Substantailly all of the polymer produced by the method given in the reference patent is in solid particle form, only a small amount (usually not over 1 or 2 weight percent of the total polymer) of light polymer being dissolved in the liquid hydrocarbon. Thus since the extra high molecular weight polyethylene produced is in the form of small particles, the separation of the polymer from the reaction mixture is greatly facilitated. The preferred extra high molecular wieght polyethylene of this invention has a density of from 0.941 to 0.955 (ASTM D 1505-65T determined), the preferred high load melt index (HLMI) is approximately 6.0 although an acceptable range is from 1.5–6.5 (as determined by ASTM D 1238-65T).

The preferred isobutylene utilized in accordance with this invention is a normally solid polymer of isobutylene having a Staudinger molecular weight in the range 80,000–120,000. Examples of this type of material and the preparation thereof are discussed in U.S. Pat. No. 2,240,582.

The extra high molecular weight polyethylene - polyisobutylene blend of the instant invention can be prepared by placing the desired quantities in proportions of the extra high molecular weight polyethylene (70–85 by weight percent, preferably 80 percent), and of the polyisobutylene (30–15 by weight percent, preferably 20 percent) in a Banbury mixer (without prior heating) and blending the materials for a period of 5–7 minutes, for example. The temperature of the polymer blend rises during this time to approximately 320°F.

The preferred extra high molecular weight polyethylene - polyisobutylene blend is as illustrated in Example I.

EXAMPLE I

|  | Weight % | HLMI | Density | Molecular Weight |
|---|---|---|---|---|
| Polyethylene | 80 | 6.0 | 0.943 | >250,000 |
| Polyisobutylene | 20 | — | — | 80–100,000 (Staudinger) |

The blend so obtained can then be sheeted on a roll mill or submitted to other types of processing. Table III describes a set of sheetline extrusion characteristics which are particularly suitable for the extrusion of the polymer blend of this invention on conventional extrusion equipment. The film extrudate is in the 1–9 mil range, preferably 2–5 mil.

TABLE III

SHEET LINE OPERATING CHARACTERISTICS
FOR EXTRUSION OF EHMWPE-PIB BLENDS

| Extruder | 3½ Dia. Royle, 24:1 L/D, 75 HP |
|---|---|
| Screw (Two Stage) |  |
| Back Stage | Front Stage |
| Feed: .450" × 8P | Feed: .450" × 1½ P |
| Trans: 3 P. | Trans: 3P |
| Meter: .180" × 4½ P. | Meter: .216" × 4 P |
| Pitch: 3½" | Pitch: 3½ P. |
| Die | 40" Wide Slot Die with Choke Bar |
| Sheet Train | Five Roll 12" Dia. Polish Stand, Conveyor and Haul-off Unit |

Still another method of preparing the blends according to this invention comprises chopping the polyisobutylene into small particles (e.g., ⅛ to ¼ inch maximum dimensions), dry blending the chopped polyisobutylene with the extra high molecular weight polyethylene in a kneader or extruder, extruding the blend through a strand die, and cutting the extrudate into cylindrical pellets.

The thermo-plastic blend can be fabricated in the form of film by any other method known in the prior art for making thermo-plastic film. Extra high molecular weight polyethylene - polyisobutylene blends can be extruded with conventional extrusion equipment utilizing operational parameters other than those described in the preferred embodiment of this invention. Equipment modifications can be made which improve output rates, decrease horsepower requirements, and keep stock temperature at an acceptable level. Similarly, extra high molecular weight polyethylene - polyisobutylene may be processed with minor design modification on conventional thermoforming, blowmolding, and injection molding machines. The preferable high load melt index range for such resinous compositions is from 4.0–6.0.

While various examples, process steps, and compositions have been specifically described herein for purpose of illustration, it will be clear to those skilled in the art that the invention is not limited thereto.

I claim:

1. A resinous composition moldable into film and other sheet-like materials having high impact strength consisting essentially of a blend of extra high molecular weight particle form polyethylene having a high load melt index in the range of 1.5 to 6.5, and an average molecular weight within the conventionally defined extra high molecular weight range geater than 250,000 up to 1.5 million said particle form polyethylene being present in the weight percentage range of 70 to 85 percent and polyisobutylene of average Staudinger molecular weight within the range of 80,000 to 120,000 being present in the range of 30 to 15 percent by weight.

2. A resinous composition according to claim 1 wherein said polyethylene has a density of from 0.941 to 0.955.

3. A resinous composition according to claim 2 wherein the amount of said polyethylene is 80 percent and the amount of said polyisobutylene is 20 percent.

4. A film formed from the resin composition according to claim 1.

5. A film according to claim 4 wherein said polyethylene has a density of from 0.941 to 0.955.

6. A film according to claim 5 wherein the amount of said polyethylene is 80 percent and the amount of said polyisobutylene is 20 percent.

* * * * *